US010011156B2

(12) United States Patent
Lee et al.

(10) Patent No.: US 10,011,156 B2
(45) Date of Patent: Jul. 3, 2018

(54) CLOUD-BASED IN-CAR HVAC SYSTEM

(71) Applicant: General Motors LLC, Detroit, MI (US)

(72) Inventors: Seungeun Lee, Sunnyvale, CA (US); Michael Kocheisen, Mountain View, CA (US); Calvin C. Chou, San Jose, CA (US); Danny P. Jiang, San Jose, CA (US)

(73) Assignee: General Motors LLC, Detroit, MI (US)

( * ) Notice: Subject to any disclaimer, the term of this patent is extended or adjusted under 35 U.S.C. 154(b) by 219 days.

(21) Appl. No.: 14/820,041

(22) Filed: Aug. 6, 2015

(65) Prior Publication Data
US 2017/0036511 A1 Feb. 9, 2017

(51) Int. Cl.
G06F 7/00 (2006.01)
B60H 1/00 (2006.01)
G01C 21/34 (2006.01)
B60W 40/08 (2012.01)
G06Q 50/30 (2012.01)
G08G 1/0967 (2006.01)

(52) U.S. Cl.
CPC ......... B60H 1/00771 (2013.01); B60W 40/08 (2013.01); G01C 21/3407 (2013.01); G06Q 50/30 (2013.01); G08G 1/096725 (2013.01); G08G 1/096741 (2013.01); G08G 1/096775 (2013.01)

(58) Field of Classification Search
CPC ... B60W 40/08; G01C 21/3407; G06Q 50/30; G08G 1/096725; G08G 1/096741; G08G 1/096775
USPC .......................................................... 701/36
See application file for complete search history.

(56) References Cited

U.S. PATENT DOCUMENTS

| 9,371,072 | B1 * | 6/2016 | Sisbot | G01C 21/3658 |
| 2012/0303964 | A1 * | 11/2012 | Kim | G06F 21/606 |
| | | | | 713/182 |
| 2013/0138714 | A1 * | 5/2013 | Ricci | G06F 9/54 |
| | | | | 709/201 |
| 2014/0222321 | A1 * | 8/2014 | Petty | G01C 21/3492 |
| | | | | 701/117 |
| 2015/0120383 | A1 * | 4/2015 | Bennah | G06Q 30/0202 |
| | | | | 705/7.31 |
| 2017/0028851 | A1 * | 2/2017 | Dhillon | B60H 1/00392 |

* cited by examiner

*Primary Examiner* — Muhammad Shafi
(74) *Attorney, Agent, or Firm* — David Willoughby; Reising Ethington P.C.

(57) ABSTRACT

A method for controlling a vehicle cabin climate is provided. The method includes the steps of receiving and aggregating data relating to one or more inputs, wherein at least some of the data is acquired at the vehicle and some of the data is acquired from sources located remotely from the vehicle. The method further includes using a climate control module to determine an optimal cabin climate based on the aggregated data, and controlling one or more climate features according to the optimal cabin climate.

19 Claims, 4 Drawing Sheets

CLOUD-BASED IN-CAR HVAC SYSTEM

TECHNICAL FIELD

The present invention relates to an in-vehicle heating, ventilating, and air conditioning (HVAC) system, and more particularly, to a cloud-based in-vehicle HVAC system that provides automated climate control.

BACKGROUND

There has been a steady increase in the use of autonomous driving features in vehicles; however, in-vehicle climate control has remained an essentially manual operation. While advances such as automatic temperature control (i.e., automatically maintaining a set temperature in the cabin) and dual-climate control features are readily available, drivers and passengers are still required to provide manual or voice input in order to adjust the cabin climate. Providing automated climate control may reduce the amount of HVAC interactions by the user and therefore may reduce driving distractions while increasing driver and passenger convenience.

SUMMARY

According to an embodiment of the invention, there is provided a method for controlling a vehicle cabin climate. The method includes the steps of receiving and aggregating data relating to one or more inputs, wherein at least some of the data is acquired at the vehicle and some of the data is acquired from sources located remotely from the vehicle. The method further includes using a climate control module to determine an optimal cabin climate based on the aggregated data, and controlling one or more climate features according to the optimal cabin climate.

According to another embodiment of the invention, there is provided a system for controlling a vehicle cabin climate. The system includes at least one vehicle system module configured to receive and aggregate data relating to one or more inputs, wherein at least some of the data is acquired at the vehicle and some of the data is acquired from sources located remotely from the vehicle, determine an optimal cabin climate based on the aggregated data, and control one or more climate features according to the optimal cabin climate.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described herein are directed to a cloud-based in-vehicle heating, ventilating, and air conditioning (HVAC) system that provides automatic control of the in-car climate (hereinafter vehicle cabin climate) based on input from cloud-connected resources and sensors including applications and services, car-borne sensors, and user controlled input. The system is configured to determine an optimal cabin climate for both the driver and the passengers through self-learning algorithms and data analysis based on the user's input and activities.

Communications System—

Figure 1:
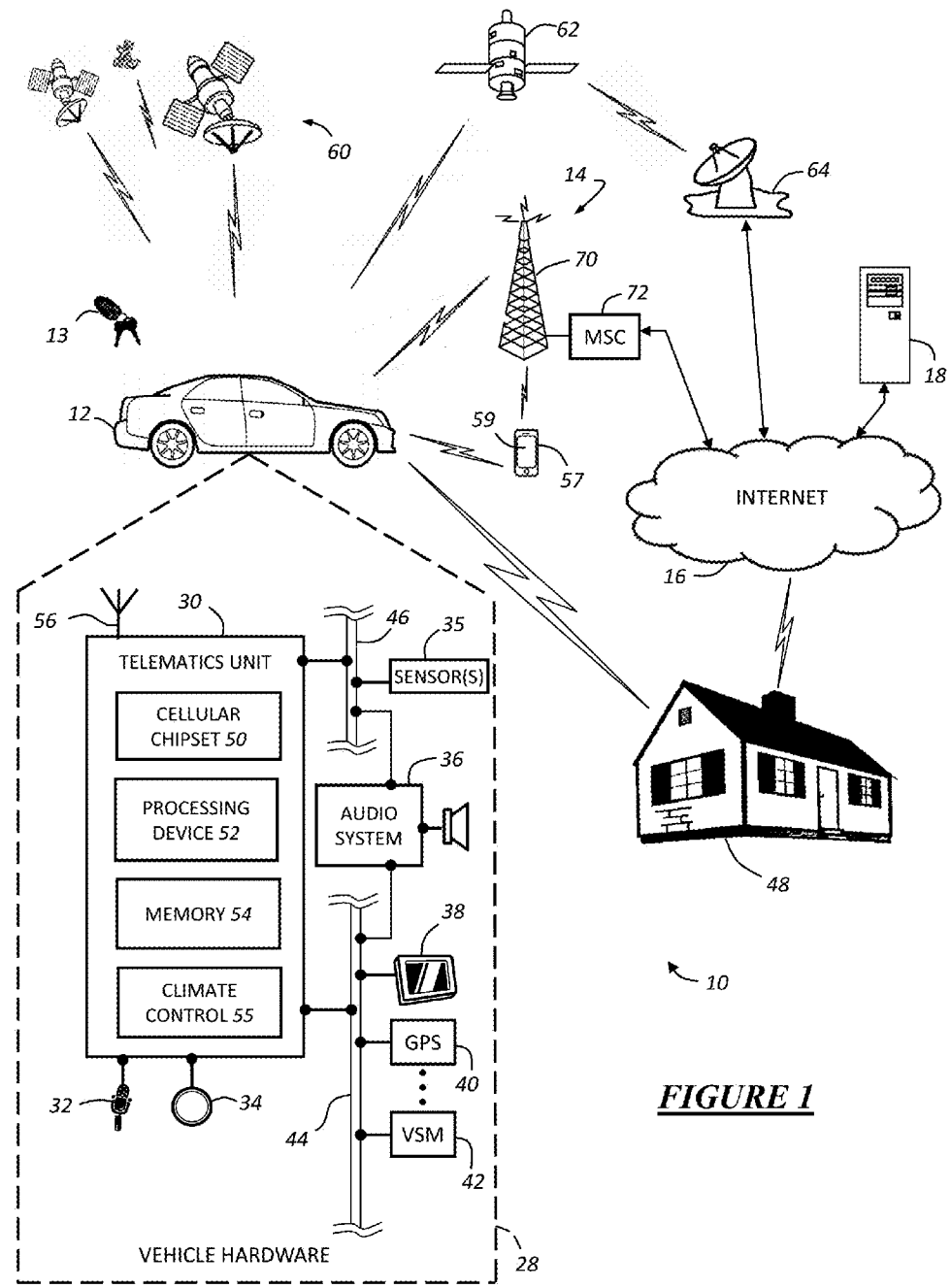
FIG. 1 is a block diagram depicting an embodiment of a communications system that is capable of utilizing the method disclosed herein.

With reference to FIG. 1, there is shown an operating environment that comprises a mobile vehicle communications system 10 that can be used to implement the method disclosed herein. Communications system 10 generally includes a vehicle 12, one or more wireless carrier systems 14, land network/Internet 16 (hereinafter Internet), and a computer 18. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, trains, aircraft, etc., can also be used. The vehicle 12 includes an electronic vehicle key or keyfob 13 and may include push-button keyless-start technology (e.g., rather than requiring insertion of the key into a switch). In the illustrated embodiment, keyfob 13 includes a remote transmitter that communicates with a base unit installed in the vehicle 12 to provide the vehicle operator with localized wireless access to various vehicle functions such as locking and unlocking doors, arming and disarming of a vehicle alarm system, trunk release, and panic signaling. As used herein, the term "keyfob" refers to any portable vehicle access device that enables access to the vehicle interior, vehicle engine operation, or both. The term "keyfob" includes both passive and active transmitters that can be attached to a key or set of keys by a loop or tether, as well as other portable remote transmitters regardless of whether they are attached to keys, as well as remote transmitters that are integrated together with a vehicle key or other device as a single component. The keyfob and its associated base unit on the vehicle may be conventional components that are well known to those skilled in the art.

Vehicle 12 also includes vehicle electronics 28, which are shown generally in FIG. 1 and include a telematics unit 30, a microphone 32, one or more pushbuttons or other control inputs 34, sensors 35, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30, which may also be referred to as an in-vehicle infotainment system, can be an OEM-installed (embedded) or an aftermarket device that is installed in the vehicle and that enables wireless voice and/or data communication over wireless carrier system 14 and via wireless networking. This enables the vehicle to communicate with other telematics-enabled vehicles or other devices either directly or through the Internet 16. For example, in one embodiment, telematics unit 30 may communicate directly or indirectly with residence 48, and more particularly, to devices within the residence such as, for example, a residential HVAC system. While called a "residence," the residence 48 can describe a vehicle owner's home, place of employment, or other geographical location (real or virtual). It should be appreciated that the residential HVAC system described herein includes the hardware and ability to communicate with the wireless carrier system 14 and/or the Internet 16 and/or the vehicle 12 directly. As such, the residential HVAC system is configured to receive computer-readable instructions that can control the HVAC system, which may be sent the computer-readable instructions and remotely controlled using an Internet protocol (IP) address. That is, the residence 48 may use an IP address assigned by the Internet 16 and also implement a private network of IP addresses at the residence 48 that can assign a local IP address to the residential HVAC system. The connection to the residential HVAC system is also used to gather climate-related information that is used to determine an optical vehicle cabin climate.

The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling and a wireless modem for data transmission. Telematics unit 30 further includes an electronic processing device 52, one or more digital memory devices 54, a climate control module 55, and a dual antenna 56. It should be appreciated that the modem and the climate control module 55 can either be implemented through software that is stored in the telematics unit 30 and executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, wireless access vehicular environment (WAVE), WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server. One of ordinary skill in the art understands that other Internet architectures may be applicable, such as named data networking (NDN) and content centered network (CCN).

One of the networked devices that can communicate with the telematics unit 30 is a wireless mobile device, such as a smart phone 57. Examples of the smart phone 57 include the iPhone™ manufactured by Apple, Inc. and Android™ based phones manufactured by Motorola, Inc. but others are known. These and other similar devices may be used or considered as a type of separate wireless device for the purposes of the method described herein. While the smart phone 57 is described with the methods below, it should be appreciated that other similar and/or simpler handheld wireless device can be successfully substituted for the smart phone 57 to carry out the method/system described herein. For instance, devices such as the iPad™ or iPod Touch™ can also use the short-range wireless protocols to communicate despite not having the capability to communicate via cellular protocols.

The smart phone 57 can include computer processing capability, a transceiver capable of communicating using a short-range wireless protocol, and a visual smart phone display 59. The smart phone display 59 may also include a touch-screen graphical user interface and/or a GPS module capable of receiving GPS satellite signals and generating GPS coordinates based on those signals. In some embodiments, the smart phone 57 can include a downloadable software application (or "app") that can be used to communicate with the vehicle, and in particular, with telematics unit 30. The app provides an interface to the vehicle and may also include navigation features and other additional vehicle services (e.g., vehicle location reporting). Smart phone 57 can be carried or operated by any one of a number of individuals. These individuals can include vehicle owners, vehicle occupants, wireless mobile device owners, wireless mobile device users, or others. These users will be interchangeably described in the following descriptions.

Processor 52 can be any type of device capable of processing electronic instructions including microprocessors, microcontrollers, host processors, controllers, vehicle communication processors, modules, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute algorithms, programs or process data to carry out at least a part of the method discussed herein.

Figure 2:
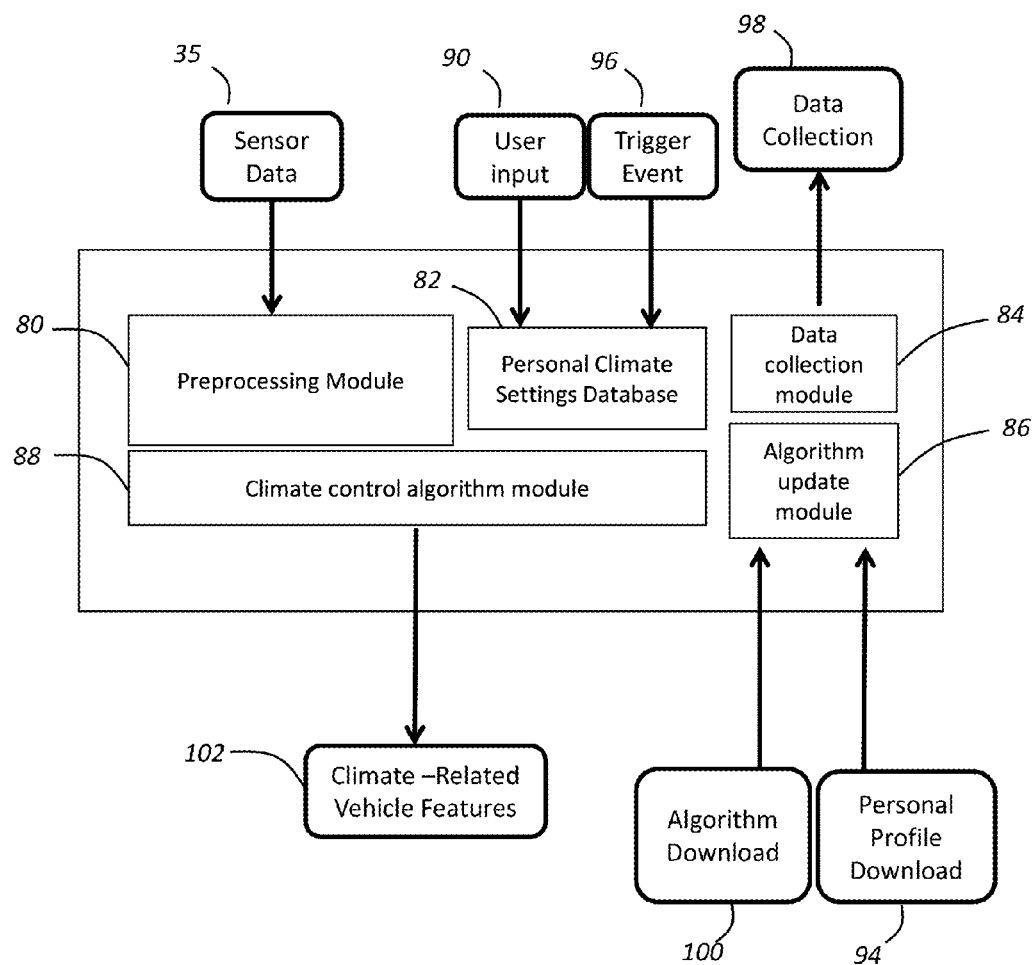
FIG. 2 is a block diagram depicting an embodiment of a vehicle system module that is capable of utilizing the method disclosed herein.

FIG. 2 illustrates an exemplary implementation of climate control module 55, which includes a preprocessing module 80, a personal climate settings database 82, a data collection module 84, an algorithm update module 86, and a climate control algorithm module 88. While each of the modules set forth above are presented as individual modules, one of ordinary skill in the art understands that this presentation is merely exemplary and that the modules can be combined and implemented in different configurations consistent with the scope of the method described herein.

The preprocessing module 80 is configured to validate and normalize input data from vehicle-borne sensors 35, which include, but are not limited to, outside and inside ambient temperature sensors, light sensors, rain sensors, humidity sensors, and location sensors (e.g., GPS). The resulting pre-processed data is then aggregated and sent to the climate control algorithm module 88.

Figure 3:
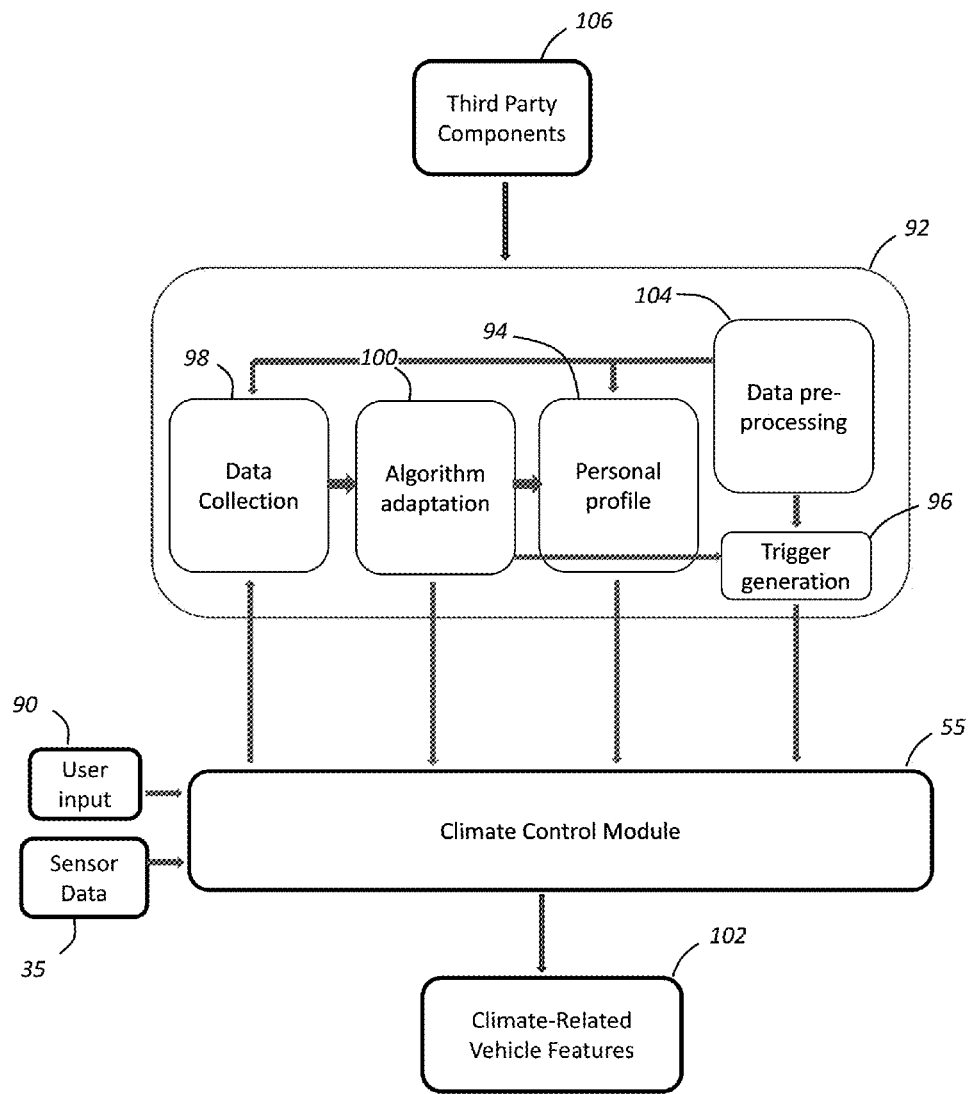
FIG. 3 is a block diagram of an exemplary implementation of a cloud service architecture in communication with the vehicle system module.

The personal climate settings database 82 is configured to record and store a user's climate preferences, which are derived from user inputs 90 and include any HVAC related button or control such as those used for temperature and fan speed. In addition to the temperature and fan speed, the user input may further includes data relating to the time of the input, the frequency of the input, the degree and level of change from a previous setting or input, and vehicle locations where the inputs took place. User input data is periodically uploaded to cloud services 92, and in particular, to the personal profile database 94, both of which are shown in FIG. 3 and described below. The personal climate settings database 82 also receives information and updates from a cloud service trigger server 96 (FIG. 3), which provides event data relating to user applications such as calendar events, body sensors, and other third party components.

The data collection module 84 is configured to communicate any user changes to the settings (e.g., temperature, fan speed, etc.) as well as all sensor and output data to a cloud data collection module 98 (FIG. 3).

The algorithm update module 86 is in communication with an algorithm adaptation server 100 and the personal profile database 94, and is configured to receive updated and trained versions of the algorithm for determining the optimal cabin climate. The algorithm update module 86 then periodically updates the algorithm stored in the climate control algorithm module 88.

The climate control algorithm module 88 contains the algorithm for determining the optimal cabin climate features. The algorithm is configured to calculate output setting for all climate related vehicle features 102 based on aggregated data from vehicle-borne sensors 35, user inputs 90, personal settings and profile data from the personal climate settings database 82, the personal profile database 94, and third party components through cloud trigger server 96. The climate related vehicle features 102 include, but are not limited to, fan speed, temperature settings for both driver and passengers, seat temperature (heating/cooling), steering wheel temperature (heating/cooling), windshield defrost/defogging, and sun visor placement, to name a few. The algorithm takes all of the user input, compares it with the current settings and other sensor input data, and optimizes the personalized climate-related values in such a way that the probability for the algorithm to calculate the correct HVAC settings next time increases. This training is done with well-known statistical optimization algorithms (e.g. back-propagation, k-Nearest-Neighbor, Hidden-Markov-Model). Thus, the algorithm "learns" to adjust to user preferences to determine the optimal climate features.

Referring again to FIG. 1 telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to other remote computer system, such as computer 18, for other purposes, such as fleet management.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. As is appreciated by those skilled in the art, the above-mentioned VSMs are only examples of some of the modules that may be used in vehicle 12, as numerous others are also possible.

Vehicle electronics 28 also include a number of vehicle user interfaces that provide vehicle occupants with a means of providing and/or receiving information, including microphone 32, pushbuttons(s) 34, sensors 35, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Sensors 35 include car-borne sensors such as, but not limited to, temperature sensors configured to detect both in-vehicle and outside temperature, rain sensors, light sensors, humidity sensors, to name a few. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with Internet 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Internet 16 (i.e., Land network/Internet) may include a conventional land-based telecommunications network that is connected to one or more landline telephones and may include a public switched telephone network (PSTN) such as that used to provide hardwired telephony, packet-switched data communications. One or more segments of Internet 16 could be implemented through the use of a standard wired network, a fiber or other optical network, a cable network, power lines, other wireless networks such as wireless local area networks (WLANs), or networks providing broadband wireless access (BWA), or any combination thereof. Internet 16 may also represent a global infrastructure of interconnected computer networks that use the standard Internet protocol suite (TCP/IP) to link billions of devices worldwide. Internet 16 is an international network of networks that consists of millions of private, public, academic, business, and government packet switched networks linked by a broad array of electronic, wireless, and optical networking technologies. These computer networks are accessible through the residence 48 and the vehicle 12 via telematics unit 30 and wireless carrier system 14 and include, but are not limited to, all cloud-based services, and all servers that host websites, proprietary servers, and DNS servers.

Computer 18 can be one of a number of computers accessible via a private or public network such as the Internet 16. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided. A computer 18 can also be used for providing Internet connectivity such as DNS services or as a network address server that uses DHCP or other suitable protocol to assign an IP address to the vehicle 12. Further, computer 18 may represent a virtualized server infrastructure that runs cloud services 92 in multiple geographically distributed nodes that contain one or more server clusters.

FIG. 3 illustrates an exemplary implementation of the cloud service architecture 92 in communication with the climate control module 55. One of ordinary skill in the art understands that the server architecture and related cloud services shown in FIG. 3 and described below are exemplary and that other configurations and combinations of services are possible and within the scope of this disclosure. The cloud service 92 includes the data collection server 98, a data pre-processing server 104, the trigger server 96, the personal profile database 94, and an algorithm adaptation server 100.

The data collection server 98 provides a data collection service that runs specified software on the cloud server infrastructure. The data collection server 98 communicates with other components inside the cloud service 92 and with the telematics unit 30, and more particularly, with the climate control module 55. Information received at the data collection server 98 from the climate control module 55 and other cloud services 92, such as the data preprocessing server 104, are stored in a cloud database, such as a SQL or NoSQL database. The information is labeled with a time stamp, IP address, and a label representing the origination point.

The data preprocessing server 104 is a data processing service that runs specified software on the cloud server infrastructure. The data preprocessing server 104 communicates with third party components 106 to receive information relating to the users preferences, schedule, and current state. The received data includes the relevant data (e.g. temperature of the home HVAC) as well as the identification of the originating device (i.e., the device generating the event). The data preprocessing service verifies the completeness of the received data and normalizes it (e.g., adjusting for different data ranges across different types of devices). The processed data is then aggregated and sent to the data collection server 98 and to the trigger server 96.

The data received from third party components 106 may include, but are not limited to, data from residential HVAC systems, data from mobile devices, data from sensors such as wearable body sensors, and GPS and weather services. For example, a background task on a user's mobile device (e.g., smart phone 57) monitors the user's calendar and sends a trigger event (i.e., a calendar event) via the standard mobile data connection to the data preprocessing server 104. The data preprocessing service combines the trigger event with other third party inputs and sends the information to the climate control module 55, usually via a standard mobile data connection. The climate control module 55 receives the information from the data preprocessing server 104 and uses this information to set the appropriate values of the different climate control components. Calendar events can be created explicitly by the user to adjust the climate (e.g. 5 min before the user usually leaves the house), or the software application on the mobile device can infer a climate adjustment event by learning over time the habits of the user. With respect to GPS and weather services, weather (e.g., rain, fog, etc.) and/or temperature changes that may be occurring at a destination location can be used to manage an optimal vehicle cabin climate at the destination location.

In addition to the calendar event, a background application on the mobile device may periodically read the user's location. Thus, when the user approaches the car, the mobile device sends an event to the data preprocessing server 104, for example, via a standard wireless connection. The data preprocessing service combines the location trigger event with other third party inputs and sends the information to the climate control module 55. The climate control module 55 receives the information from the data preprocessing server 104 and uses this information to set the appropriate values of the different climate control components.

The data preprocessing server 104 may also receive data from body sensors worn by vehicle occupants (in or out of the vehicle). A software application associated with the wearable device or body sensor sends vital signs readings (e.g. heart rate, skin temperature, etc.) over a standard Bluetooth connection to the user's smartphone 57 or other computing device. A background application on the smartphone 57 records the data and sends it via a wireless connection to the data preprocessing server 104. The preprocessing service processes the input and sends the information to the climate control module 55, which uses the data to adjust the climate settings in the vehicle. In an alternative implementation, the wearable device can be directly connected to the vehicle's telematics unite 30 over a standard Bluetooth connection or other connectivity available in the vehicle.

The trigger server 96 runs specified software on the cloud server infrastructure and communicates with the climate control module 55. The trigger server 96 is configured to receive data from the data preprocessing server 104. Based on a device identifier in the data, the trigger service determines the mapping to the relevant vehicle 12 through a lookup in its database. In one embodiment, the database is an SQL database that contains the mapping between device identifiers and vehicle (identifiably by VIN number). Once the lookup has been performed, the trigger services connect and send the corresponding data event to the climate control module 55. To the extent a connection to the climate control module 55 cannot be established, a retry mechanism with progressive back-off is employed. Once too many retries have been attempted without success, the trigger event is discarded.

The personal profile database 94 stores personal profile parameters associated with the algorithm used to determine the optimal cabin climate. The personal profile database 94 communicates with other cloud services such as the data preprocessing server 104 and the algorithm adaptation server 100. The stored personal parameters can be downloaded when the user changes to a different vehicle, so the personal climate settings will follow the driver.

The algorithm adaptation server 100 runs specified software on the cloud server infrastructure and is configured to train and improve the current algorithm used by the climate control module 55 to determine the optimal cabin climate. The algorithm adaptation service uses data collected from a multitude of vehicles (i.e., the "Big Data" approach), which optimizes the algorithm in a way not possible with data provided by only a single user. "Big Data" typically includes data sets with sizes beyond the ability of commonly used software tools to capture, curate, manage, and process data within a tolerable elapsed time. Big data "size" is a constantly moving target, but can range from a few dozen terabytes to many petabytes of data. Big data is a set of techniques and technologies that require new forms of integration to uncover large hidden values from large datasets that are diverse, complex, and of a massive scale.

The algorithm is trained using a training dataset as each data point gathered from the multitude of vehicles is fed into the current algorithm and compared with a desired outcome. If the outcome deviates, the parameters of the algorithms are changed slightly through a statistical optimization calculation to improve the outcome. After each iteration of the training set the algorithm is evaluated using a test set. This process is repeated until the overall algorithm demonstrates improved performance. The newly trained algorithm is then available for download to the vehicle telematics unit 30 via a pull or push method as known in the art.

Method—

Figure 4:
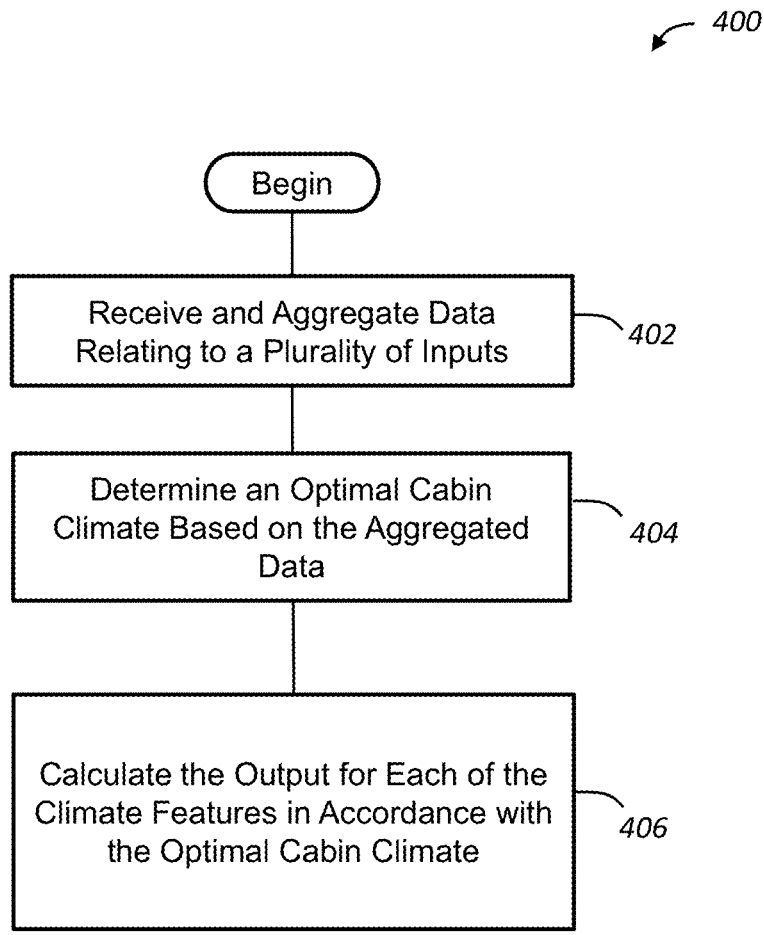
FIG. 4 a flow chart illustrating an exemplary embodiment of the method disclosed herein.

FIG. 4 illustrates a method 400 for automatically controlling vehicle cabin climate features based on input from cloud-connected resources and sensors, vehicle-borne sensors, and user controlled input. At step 402, data relating to a plurality of inputs is received and aggregated. Data is received by both the cloud services 92 and by the climate control module 55. Data received by the cloud services 92 includes data from applications that reside on any computing device such as wireless mobile devices, computers, tablets, smart watches, smartphones, and computing devices residing in other vehicles. The data may include calendar events, location based services, and sleepiness warning systems, to name a few. Data received by the cloud services 92 may further include input from other third party components including information from wearable body sensors and home-based HVAC systems. Data received by the climate control module 55 may include input from car-borne sensors such as, for example, temperature sensors, light sensors, rain sensors, humidity sensors, and global positioning systems. Data received by the climate control module 55 may further include user input such as user adjustments to the vehicle HVAC system. All of the data received through the cloud services 92 and by the climate control module 55 may also include time stamps, location of the event, frequency, and degree of change in the monitored data. The received data is processed by the preprocessing module 80 and the data preprocessing server 104, which validate and normalize the input data. Periodically, all of the received data is exchanged between the cloud services 92 and by the climate control module 55.

At step 404, the algorithm stored in the climate control algorithm module 88 determines an optimal cabin climate based on the aggregated data. The algorithm is periodically trained by algorithm adaptation server 100 using data collected from all of the input sources (i.e., user input 90, sensor data 35, data from third party components 106, personal profile data 94, etc.) including data collected from other vehicles (e.g., "big data"). The updated algorithm is then downloaded to the climate control algorithm module 88.

A climate adjustment or calculation according to step 404 can be triggered by a variety of events. For example, a user may unlock a door using the keyfob 13 or simply approach the vehicle while carrying the keyfob 13. The keyfob 13 transmits a signal to the keyfob receiver unit, which in turn sends a wake-up signal to the telematics unit 30. When the telematics unit 30 is running, the climate control algorithm stored in the climate control algorithm module 88 is launched. The climate control algorithm then determines the optimal cabin climate based on data such as the current in-cabin and outside temperature, time and location, and weather conditions. This data is compared to known and learned and user preferences to determine the optimal cabin climate. A climate determination may also be initiated based on other input triggers such as a calendar event. For example, calendar input may indicate that a user has an appointment or is going to the gym. The climate control algorithm can anticipate these events and take them into consideration when calculating the optimal cabin climate.

At step 406, the climate control algorithm calculates the appropriate output for each of the climate features in accordance with the optimal cabin climate. In other words, output settings for each of the vehicle climate features is determined to the optimal cabin climate may be achieved. This includes output settings for fan speed, temperature settings for both driver and passenger, seat heating and cooling, steering wheel heating and cooling, and sun visor placement, to name a few. The settings are sent over the vehicle communications bus to the embedded controllers associated with each of the climate features.

As set forth above, the climate control algorithm can anticipate when a user may be using the vehicle and the current conditions to pre-cool or pre-heat the vehicle prior to the user entering the vehicle. In addition, the climate control algorithm may determine based on a combination of GPS functionality, calendar events, and mobile device applications, that the user is bound for a particular destination, such as residence 48. Knowing the user's destination and arrival time, the telematics unit 30 may establish a connection to the residential HVAC system so that the temperature at the residence may be set similarly to the optimal vehicle cabin climate.

Another feature of the system includes a fuel and battery saving mode wherein the telematics unit 30, and in particular the climate control module 55, controls and optimizes the climate settings based on the vehicle's destination and remaining fuel. For instance, the system calculates how far the vehicle can operate with and without climate features such as air conditioning and lowers the settings accordingly to conserve fuel and battery resources.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for controlling a vehicle cabin climate, the method comprising the steps of:
   receiving aggregated data from a cloud service architecture, wherein the aggregated data relates to a plurality of inputs, wherein at least some of the data is acquired from input sources at the vehicle and some of the data is acquired from input sources located remotely from the vehicle;
   using an algorithm stored in a climate control module, determining an optimal cabin climate based on the aggregated data, wherein the algorithm is periodically updated with a trained version of the algorithm from the cloud service architecture that is statistically optimized using data acquired from all of the input sources; and
   controlling one or more climate features according to the optimal cabin climate.

2. The method of claim 1, wherein the plurality of inputs include input from at least one of the following sources: car-borne sensors, user input, input from a personal profile, and input from third party components.

3. The method of claim 2, wherein the input from car-borne sensors includes input from at least one of: temperature sensors, light sensors, rain sensors, humidity sensors, and global positioning systems.

4. The method of claim 2, wherein the user input includes user adjustments to a vehicle heating, cooling, and air conditioning system.

5. The method of claim 4, further including the step of comparing the user input to current vehicle climate settings.

6. The method of claim 2, wherein the input from third party components includes input from applications such as calendar events, location based services, and sleepiness warning systems, wherein the applications reside on any computing device such as mobile devices, computers, tablets, smart watches, smartphones, and computing devices residing in other vehicles.

7. The method of claim 2, wherein the input from third party components includes information from wearable body sensors and a home-based heating, cooling, and air conditioning system.

8. The method of claim 7, wherein the input from third party components is received and processed by a plurality of cloud services.

9. The method of 1, wherein the climate features include at least one of: a temperature in the vehicle cabin, a humidity level in the vehicle cabin, vehicle seat heating and cooling, steering wheel heating and cooling, and adjustment of sun visors.

10. The method of 1, further including controlling climate features relating to a residential heating, cooling, and air conditioning system according to the optimal cabin climate.

11. The method of 1, further including adjusting the vehicle climate features based on destination and fuel levels.

12. The method of 1, wherein the step of determining the optimal cabin climate is based on a trigger event.

13. The method of claim 1, wherein the algorithm is further optimized using a big data approach.

14. The method 13, wherein cloud services are employed to train and optimize the algorithm.

15. A system for controlling a vehicle cabin climate, the system comprising:

at least one vehicle system module configured to:

receive aggregated data from a cloud service architecture, wherein the aggregated data relates to a plurality of inputs, wherein at least some of the data is acquired from input sources at the vehicle and some of the data is acquired from input sources located remotely from the vehicle;

using an algorithm stored in a climate control module, determine an optimal cabin climate based on the aggregated data, wherein the algorithm is periodically updated with a trained version of the algorithm from the cloud service architecture that is statistically optimized using data acquired from all of the input sources; and control one or more climate features according to the optimal cabin climate.

16. The system of claim 15, wherein the one or more inputs include input from at least one of: car-borne sensors, user input, input from a personal profile, and input from third party components.

17. The system of claim 16, wherein the at least one vehicle system module is a telematics unit in communication with cloud services that provide input to the telematics unit.

18. The system of claim 16, wherein the at least one vehicle system module is in communication with a plurality of cloud services configured to receive and process the input from third party components.

19. The system of claim 15, wherein the at least one vehicle system module is further configured to validate and normalize the data relating to the one or more inputs.

* * * * *